US011713892B2

(12) United States Patent
Holyoake et al.

(10) Patent No.: US 11,713,892 B2
(45) Date of Patent: Aug. 1, 2023

(54) FIRE DAMPER

(71) Applicant: Price Holyoake (NZ) Limited, Auckland (NZ)

(72) Inventors: Scott Noel Holyoake, Auckland (NZ); Gary Brian Holder, Whitford (NZ)

(73) Assignee: PRICE HOLYOAKE (NZ) LIMITED, Auckland (NZ)

( * ) Notice: Subject to any disclaimer, the term of this patent is extended or adjusted under 35 U.S.C. 154(b) by 662 days.

(21) Appl. No.: 16/416,497

(22) Filed: May 20, 2019

(65) Prior Publication Data

US 2019/0353371 A1 Nov. 21, 2019

(30) Foreign Application Priority Data

May 21, 2018 (NZ) ........................................ 742724

(51) Int. Cl.
*F24F 11/35* (2018.01)
*A62C 2/06* (2006.01)
(Continued)

(52) U.S. Cl.
CPC .............. *F24F 11/35* (2018.01); *A62C 2/065* (2013.01); *F16L 37/113* (2013.01); *F16L 37/133* (2013.01)

(58) Field of Classification Search
CPC . F16L 5/04; F16L 3/1008; F16L 3/105; F16L 3/1211; F16L 3/137
(Continued)

(56) References Cited

U.S. PATENT DOCUMENTS 2,648,326 A * 8/1953 Epstein ..................... F16L 5/00
454/44
2,711,080 A * 6/1955 Jewell ................ F24F 13/0209
236/49.5
(Continued)

FOREIGN PATENT DOCUMENTS

AT 411965 B * 7/2004 ............. A62C 2/065
AU 7185998 A * 12/1998
(Continued)

OTHER PUBLICATIONS

First Examination Report in New Zealand Patent Application No. 753391, New Zealand Intellectual Property Office, dated Oct. 18, 2019 (3 pages).
(Continued)

*Primary Examiner* — Edelmira Bosques
*Assistant Examiner* — Frances F. Hamilton
(74) *Attorney, Agent, or Firm* — Nixon Peabody LLP (57) ABSTRACT

A fire damper for an air distribution system includes a body defining a flow path and a closure means adapted to close the flow path when a temperature within the flow path exceeds a predetermined maximum temperature. A first flange is fixed to the body and a mounting means comprising a second flange is slidably engageable with and removable from the body. The mounting means comprises securing means for securing the mounting means to the body such that a building element through which the fire damper extends, in use, can be clamped between the first and second flanges. A flexible insulating sleeve configured for use with a fire damper, and a method of installing a fire damper, are also disclosed.

20 Claims, 5 Drawing Sheets

(51) Int. Cl.
    *F16L 37/113*     (2006.01)
    *F16L 37/133*     (2006.01)

(58) Field of Classification Search
    USPC .................................................... 454/369
    See application file for complete search history.

(56) References Cited

U.S. PATENT DOCUMENTS

| | | | | |
|---|---|---|---|---|
| 3,543,439 | A * | 12/1970 | Pantland | F24F 13/1486 49/7 |
| 3,575,234 | A * | 4/1971 | Dieckmann | F24F 13/0263 165/49 |
| 3,605,797 | A * | 9/1971 | Dieckmann et al. | F24F 13/0263 137/375 |
| 4,146,048 | A | 3/1979 | McCabe | |
| 4,219,041 | A | 8/1980 | McCabe et al. | |
| 4,241,748 | A * | 12/1980 | McCabe | A62C 2/14 137/77 |
| 4,295,486 | A * | 10/1981 | McCabe | A62C 2/241 137/80 |
| 4,474,167 | A | 10/1984 | McCabe | |
| 4,579,047 | A * | 4/1986 | Zielinski | A62C 2/16 454/369 |
| 4,625,626 | A * | 12/1986 | Aalto | A62C 2/12 137/75 |
| 4,625,632 | A * | 12/1986 | Markman | F24F 13/1486 29/890.12 |
| 4,628,954 | A * | 12/1986 | Dayus | F16K 15/036 137/75 |
| 4,633,768 | A * | 1/1987 | Benson | F24F 7/10 237/46 |
| RE32,362 | E * | 2/1987 | McCabe | F16K 1/223 137/75 |
| 4,669,244 | A * | 6/1987 | Szoke | E04F 17/08 285/192 |
| 4,846,147 | A * | 7/1989 | Townsend | F23J 13/02 126/307 R |
| 4,858,517 | A * | 8/1989 | Coker | F23L 11/00 137/75 |
| 4,958,687 | A * | 9/1990 | Nakagawa | A62C 2/12 169/60 |
| 5,165,732 | A * | 11/1992 | Townsend | F23J 13/04 126/307 R |
| 5,421,127 | A * | 6/1995 | Stefely | A62C 2/06 52/220.8 |
| 5,456,050 | A * | 10/1995 | Ward | H02G 3/0412 52/220.8 |
| 5,522,571 | A * | 6/1996 | Simmons | F16L 3/14 248/59 |
| 5,548,934 | A * | 8/1996 | Israelson | A62C 2/065 52/1 |
| 5,921,592 | A * | 7/1999 | Donnelly | F16L 37/091 285/239 |
| 6,141,915 | A * | 11/2000 | Andersen | H02G 3/22 52/1 |
| 6,447,393 | B1 * | 9/2002 | McCabe | A62C 2/14 454/342 |
| 6,629,706 | B2 * | 10/2003 | Tigerfeldt | F16L 5/04 285/47 |
| 6,634,352 | B2 * | 10/2003 | Maiello | F23J 13/04 126/307 R |
| 6,910,506 | B2 * | 6/2005 | Gabriel | F01N 13/08 138/109 |
| 6,991,536 | B2 * | 1/2006 | Perrin | F24F 13/1406 454/369 |
| 7,566,079 | B1 * | 7/2009 | Callahan | F16L 37/113 285/314 |
| 7,596,914 | B2 * | 10/2009 | Stahl, Sr. | F16L 5/04 52/220.8 |
| 8,029,345 | B2 * | 10/2011 | Messmer | F16L 5/04 454/286 |
| 8,141,594 | B2 * | 3/2012 | Shumate | F24F 13/0263 428/35.9 |
| 8,491,363 | B2 * | 7/2013 | Dirnberger | F16K 1/2007 454/333 |
| 9,103,116 | B2 * | 8/2015 | McConnell | A62C 2/065 |
| 9,220,932 | B2 * | 12/2015 | Zernach | A62C 2/065 |
| 10,006,577 | B2 * | 6/2018 | Meister | F16L 37/244 |
| 10,119,504 | B2 * | 11/2018 | Kohler | F02M 35/10144 |
| 10,363,443 | B2 * | 7/2019 | King, Jr. | A62C 2/065 |
| 2001/0055947 | A1 * | 12/2001 | McCabe | A62C 2/14 137/75 |
| 2004/0058639 | A1 * | 3/2004 | Perrin | A62C 2/12 454/369 |
| 2004/0149390 | A1 * | 8/2004 | Monden | F16L 5/04 156/391 |
| 2006/0070618 | A1 * | 4/2006 | Schimmeyer | F22B 7/18 126/307 A |
| 2007/0017738 | A1 * | 1/2007 | Truss | F16L 55/1026 181/209 |
| 2008/0113613 | A1 * | 5/2008 | Petrossian | A62C 2/12 454/369 |
| 2009/0197522 | A1 * | 8/2009 | Perrin | A62C 2/12 454/369 |
| 2010/0223773 | A1 * | 9/2010 | Florian | F24F 13/14 29/283 |
| 2012/0100319 | A1 * | 4/2012 | Keller | F16L 5/04 428/34.1 |
| 2013/0324028 | A1 * | 12/2013 | Sandman | F16L 25/14 285/364 |
| 2015/0330661 | A1 * | 11/2015 | Hill | F24F 13/14 454/333 |
| 2016/0047502 | A1 * | 2/2016 | Varghese | E21B 17/043 285/89 |
| 2020/0101331 | A1 * | 4/2020 | Gauch | A62C 2/065 |
| 2021/0222425 | A1 * | 7/2021 | Holder | E04B 1/948 |

FOREIGN PATENT DOCUMENTS

| | | | |
|---|---|---|---|
| DE | 19825407 A1 | 12/1999 | |
| EP | 0543354 A1 | 5/1993 | |
| EP | 1995531 A1 * | 11/2008 | ............. F16L 41/08 |
| EP | 1960058 B1 | 6/2010 | |
| EP | 2398563 B1 | 10/2014 | |
| EP | 2823862 B1 | 10/2016 | |
| GB | 2161655 A | 1/1986 | |
| JP | H 0669565 U | 9/1994 | |
| KR | 101687140 B1 * | 12/2016 | |
| KR | 20170003702 U * | 10/2017 | |

OTHER PUBLICATIONS

PAROC Solutions, "Solutions for HVAC Insulations" brochure; Helsinki, Finland; Mar. 2014 (20 pages).
Patent Examination Report in New Zealand Patent Application No. NZ 761645, dated Jun. 29, 2021 (5 pages).
Patent Examination Report in New Zealand Patent Application No. NZ 761648, dated Jun. 30, 2021 (5 pages).
New Zealand Ravenscroft, "Ravenscroft BSD (Series 2) Fire Damper for Plasterboard Walls," Publication date unknown (2 pages).
Australian Examination Report No. 1 for Application No. 2021201797, dated Jun. 17, 2022 (6 pages).

* cited by examiner

FIRE DAMPER

CROSS-REFERENCE TO RELATED APPLICATIONS

This application claims priority to and the benefit of New Zealand Provisional Patent Application Number 742724, filed May 21, 2018, the disclosure of which is hereby incorporated by reference herein in its entirety.

TECHNICAL FIELD

The present disclosure relates to a fire damper for impeding the spread of fire and smoke through a cavity in a wall or floor which has been formed for air flow, in particular HVAC air flow.

BACKGROUND

Combination smoke and fire dampers are used in buildings to aid in preventing the spread of fire and smoke in the event of a fire in the building. For simplicity such dampers are referred to herein as "fire dampers".

Fire dampers are a form of passive fire protection and are usually associated with an air distribution system, for example an air conditioning system. Ducts, holes or passageways are adapted to allow air to flow through walls, partitions or floors. These are required to be equipped with a fire damper that meets the fire rating standard set by a relevant building code. The damper is usually designed to shut or block the passage during a fire in order to prevent the spread of smoke and/or fire.

Fire dampers may be configured to impede the spread of fire and heat within building compartments whilst maintaining the integrity of the building element (most commonly a wall) through which the damper passes in use.

Current forms of fire dampers may be installed with high temperature insulation wool, for example Kaowool®, wrapped around the outside of the body of the damper. The insulation is resistant to high temperatures and is used to insulate the internal cavity of the building element from the external surface of the fire damper so that heat from within the air distribution system is not conducted to the wall during a fire.

Because the damper is very difficult to install with the insulation in place, one damper of the prior art utilises a flanged steel sleeve around the insulation. However, since the steel sleeve conducts heat from the room bordered by the wall, this design relies on the cavity within the wall being air-tight in order to prevent the internal wall structure from heating up and catching fire. This is disadvantageous, as it is difficult to ensure that the cavity remains air-tight, particularly if other apertures are made in the walls (for example for services such as plumbing or electrical).

Another form of fire damper is provided with a ceramic sleeve to insulate the fire damper. However, a disadvantage of this is that the ceramic is a brittle material and can sometimes be damaged if not handled correctly. If the fire damper is accidentally dropped prior to installation the ceramic sleeve may break. This means the fire damper needs to be transported and installed carefully to avoid damage.

Another disadvantage of current fire dampers is that they may be difficult or time consuming to install. The installation process may require specialized tools and/or knowledge. It is important that fire dampers are installed correctly as they may not function as required if installed incorrectly. In addition, fire dampers which are mounted to the wall by means of fasteners extending into the face of the wall may require a relatively large outer flange, which may mean that the damper must be mounted further from the ceiling of the building than is optimum.

SUMMARY

According to some implementations of the present disclosure, a fire damper for an air distribution system comprises a body defining a flow path; a closure means adapted to close the flow path when a temperature within the flow path exceeds a predetermined maximum temperature; a first flange which is fixed to the body; and a mounting means comprising a second flange which is slidably engageable with and removable from the body. The mounting means includes securing means for securing the mounting means to the body such that a building element through which the fire damper extends, in use, can be clamped between the first and second flanges.

The above summary is not intended to represent each embodiment or every aspect of the present invention. Additional features and benefits of the present invention are apparent from the detailed description and figures set forth below.

BRIEF DESCRIPTION OF DRAWINGS

Further aspects of the present disclosure will become apparent from the following description which is given by way of example only and with reference to the accompanying drawings in which.

DETAILED DESCRIPTION

The present disclosure describes an improved fire damper for impeding the spread of fire in a building and provides certain desirable advantages.

All references, including any patents or patent applications that may be cited in this specification are hereby incorporated by reference. No admission is made that any reference constitutes prior art. Any discussion of the references states what their authors assert, and the applicants reserve the right to challenge the accuracy and pertinency of the documents that may be cited. It will be clearly understood that, although a number of prior art publications may be referred to herein, this does not constitute an admission that they form part of the common general knowledge in the art, in New Zealand or in any other country.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Further aspects and advantages of the present disclosure of an improved fire damper will become apparent from the ensuing description which is given by way of example only.

Referring first to FIGS. 1 to 4, a fire damper for an air distribution system, for example an air conditioning system, is generally referenced by arrow 100.

The damper 100 comprises a body 1 which defines a flow path between an inlet 2 and an outlet 3. In preferred embodiments the body 1 is substantially cylindrical, although in other embodiments the body 1 may have a non-circular transverse cross-section.

The damper 100 is provided with a closure means 4 which is adapted to close or block the flow path when a temperature within the flow path exceeds a first predetermined temperature, for example 70° C. In the embodiment shown the closure means 4 comprises a rotatably mounted plate 5. The plate 5 is operatively connected to a biasing means, for example a spring formation 6, which biases the plate 5 to the closed position shown in FIGS. 1 to 7. A suitable temperature dependent holding means 7 is provided to hold the closure means 4 in an open position until the temperature within the flow path exceeds the first predetermined temperature. In one embodiment the holding means 7 comprises a fusible link, such as is known to the art. In other embodiments of the disclosure (not shown) an alternative closure means 4 and/or holding means 7 may be provided.

Bimetallic Strip

Figure 1:
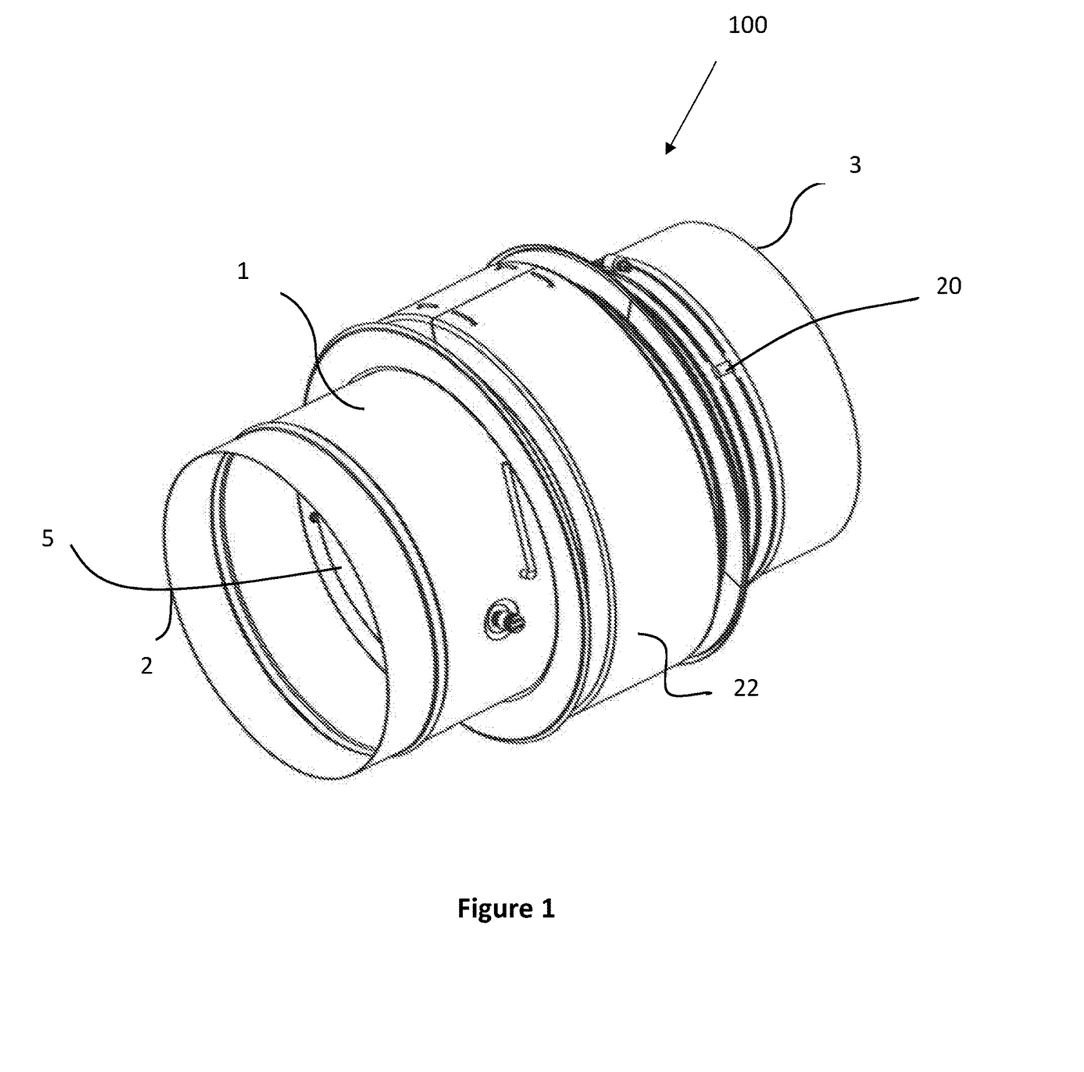
FIG. 1 shows a side perspective view of a fire damper according to an embodiment of the present disclosure.
Figure 2:
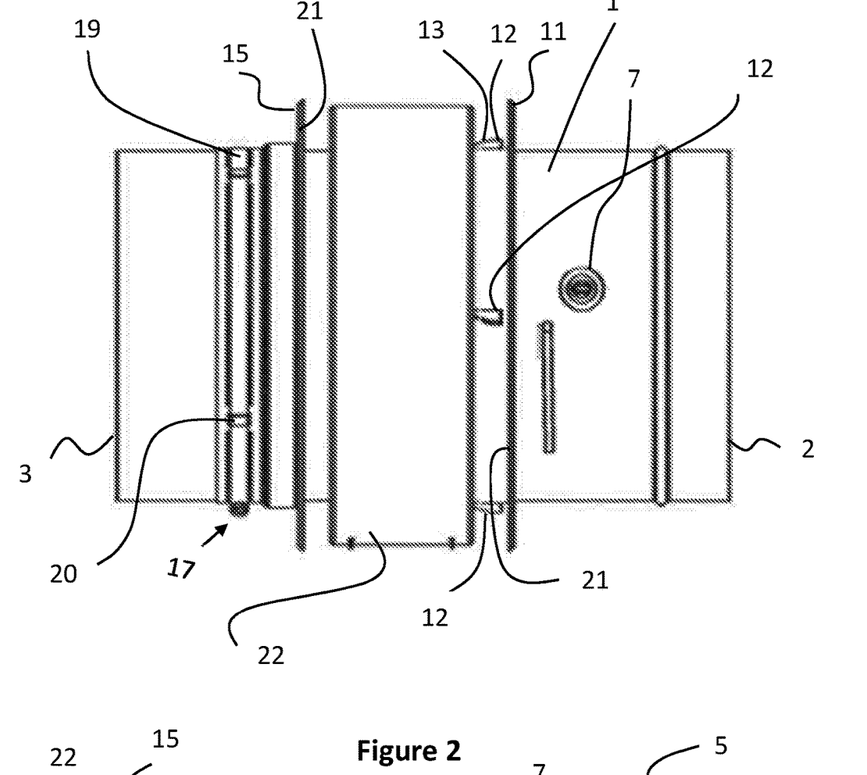
FIG. 2 shows a side view of the fire damper of FIG. 1.
Figure 3:
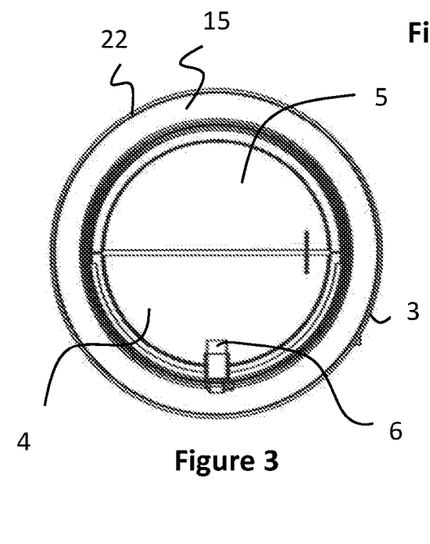
FIG. 3 shows a view of the fire damper of FIG. 1 from one end.
Figure 4:
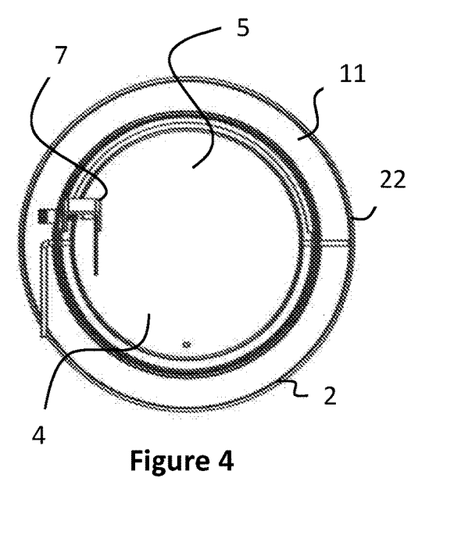
FIG. 4 shows an end view of the fire damper of FIG. 1 opposite to the end view shown in FIG. 3.
Figure 5:
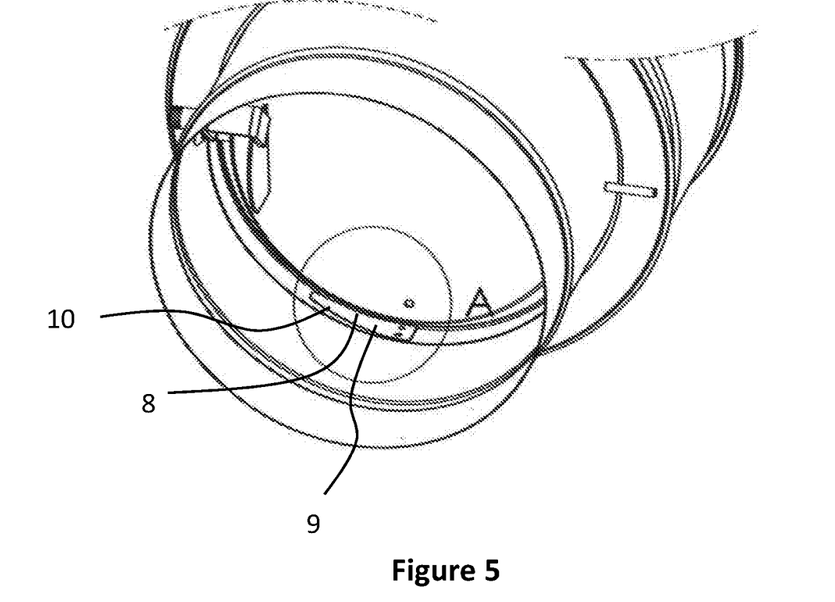
FIG. 5 shows a partial perspective view of one end of the fire damper of FIG. 1.
Figure 6:
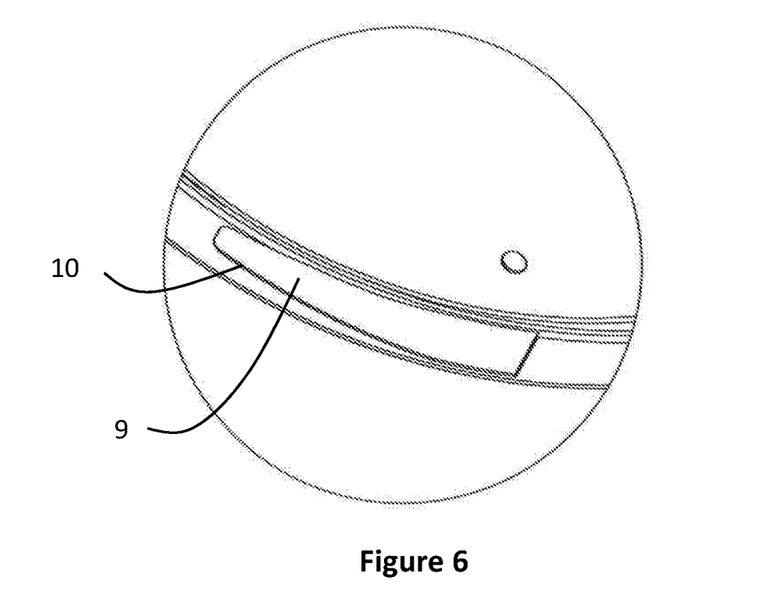
FIG. 6 shows an enlarged view of detail A of FIG. 5.

Referring next to FIGS. 5 and 6, in the embodiment shown the damper 100 is provided with a locking means 8 for locking the rotatable plate 5 in the closed position when the temperature within the flow path exceeds a predetermined maximum temperature. In the embodiment show the locking means 8 comprises a bimetallic strip 9 which is mounted inside the body 1 within the flow path. The bimetallic strip 9 may be configured to bend inward towards a centre of the flow path when the temperature within the flow path exceeds a second predetermined maximum temperature. The second predetermined maximum temperature is lower than the first predetermined temperature, and may be, for example 40° C. The bimetallic strip 9 is preferably shaped and orientated such that the rotatable plate 5 can pass over the bimetallic strip 9 (possibly by deflecting the strip) when the holding means 7 releases the closure means 4 (i.e. stops resisting movement to the closed position), thereby allowing the spring formation 6 to move the plate 5 to the closed position. However, the bimetallic strip 9 is configured and orientated to prevent movement of the plate 5 away from the closed position for as long as the temperature within the flow path is greater than the second predetermined maximum temperature. When the temperature within the flow path is less than the second predetermined maximum temperature the bimetallic strip 9 is configured to move to an initial position (shown in FIGS. 5 and 6) in which the strip does not interfere with the movement of the closure means 4. In the embodiment shown the bimetallic strip 9 lies against an internal wall of the body 1 when in the initial position. In alternate embodiments (not shown), more than one bimetallic strip 9 may be used to prevent movement of the plate 5 away from the closed position. The bimetallic strips may be located on opposite sides of the internal wall. The bimetallic strips may also be located such that they are positioned on opposite sides of the plate 5 when it is in the closed position.

In some embodiments the bimetallic strip 9 may have taper 10 on one side to facilitate the plate 5 in moving to the closed position over the strip. In some forms of the technology the bimetallic strip starts to bend inwards when the temperature within the flow path exceeds a temperature of approximately 40° C. However, the bimetallic strip 9 only reaches an effective position, (i.e. when the bimetallic strip is configured and orientated to prevent movement of the plate 5 away from the closed position) when temperature exceeds the predetermined temperature of the temperature dependent holding means 7.

Moveable Flange

Figure 7:
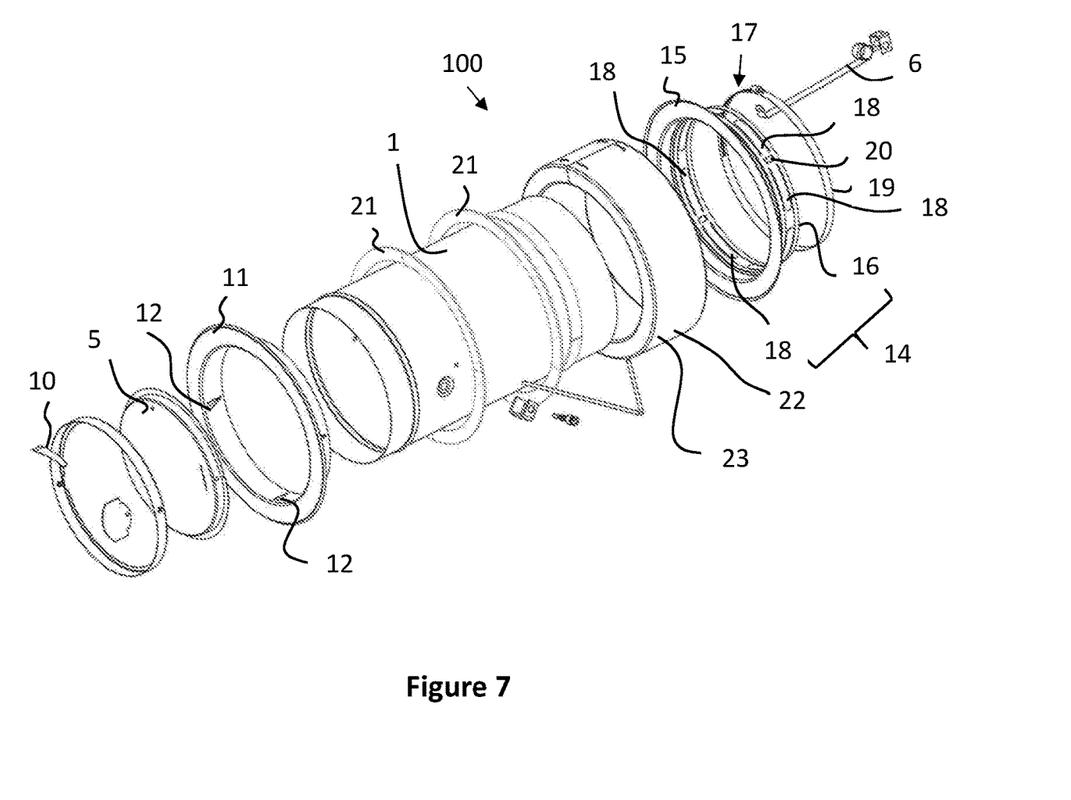
FIG. 7 shows an exploded view of a fire damper of FIG. 1.

Referring back to FIGS. 1 to 4, and in particular FIG. 7, a first flange 11 is fixed to an exterior of the body 1. In the embodiment shown the first flange 11 extends around the entire circumference of the cylindrical body 1. A plurality of spacers 12 may be provided adjacent the first flange 11 to prevent contact between an exterior surface of the body 1 and an internal surface of an aperture in a building element (e.g. a wall, partition, floor or ceiling) through which the fire damper 100 extends when in use. The spacers 12 are preferably spaced apart around the circumference of the body 1. In preferred embodiments each spacer 12 comprises a ramp portion 13 to assist with insertion of the damper 100 and the spacers into the aperture.

The damper 100 is further provided with a mounting means 14 comprising a second flange 15 connected to an annular base 16. The mounting means 14 is slidable relative to the exterior of the body 1 and can be removed entirely from the body 1. The mounting means 14 is further provided with securing means 17 for securing the mounting means 14 to the body 1 when in use.

In the embodiment shown the securing means 17 comprises at least one tongue 18, more preferably a plurality of tongues 18. Each tongue 18 extends circumferentially, substantially parallel to the base 16 of the mounting means 14, and is connected to the base 16. In preferred embodiments the tongue(s) 18 and the base 16 of the mounting means 14 may be integrally formed. For example, in the embodiment shown each tongue 18 is defined by a cutting a slot in the base 16 of the mounting means 14 to define the outer edge of the tongue 18.

The securing means 17 further comprises an adjustable ring 19 which is configured to extend around the tongue(s) 18 and to clamp the at least one tongue 18 to an outer surface of the body 1. In a preferred embodiment the adjustable ring 19 comprises a hose clamp, for example a worm drive type hose clamp. The securing means 17 allows the mounting means 14 to be secured to the body 1 of the damper 100 at any required position along the body 1 such that the second flange 15 can abut, in use, an external surface of the building element to which the damper 100 is mounted in use.

In preferred embodiments the base 16 of the mounting means 14 is provided with at least one, more preferably a plurality of retaining means 20 for retaining the securing means 17 in position on the base 16 of the mounting means 14. The retaining means 20 may comprise loop formations formed in the base 16.

In preferred embodiments one or more preferably both flanges 11, 15 may be provided with an intumescent material 21 to create an improved seal against the building element when in use.

Flexible Sleeve

In preferred embodiments of the disclosure a flexible insulating sleeve 22 is provided around the body 1 of the damper 100, when in use, and extends along a portion of the length of the body 1.

The insulating sleeve 22 acts as a heat shield and comprises a flexible high temperature insulating material such as a refractory ceramic wool fibre provided within a flexible casing. In preferred embodiments the outer casing 23 comprises a metalized foil fibreglass fabric. The flexible casing is preferably reflective so as to minimise radiant heat absorption by the insulating material.

In preferred embodiments the insulating sleeve 22 is substantially ring-shaped or annular. The insulating sleeve 22 preferably has an inside diameter which is greater than an outside diameter of the body 1 of the damper 100 such that in use, the insulating sleeve 22 does not touch the body 1 of the damper 100, or at least does not touch the body 1 of the damper 100 around its entire circumference. In this way conductive heat transfer from the body 1 of the damper 100 to the insulating sleeve 22 is minimised.

In one embodiment the sleeve 22 (e.g. for use with a damper body having an outside diameter of substantially 240 mm) has an inside diameter of substantially 270 mm, and is substantially 30 mm thick and 100 mm long.

Installation

Figure 8:
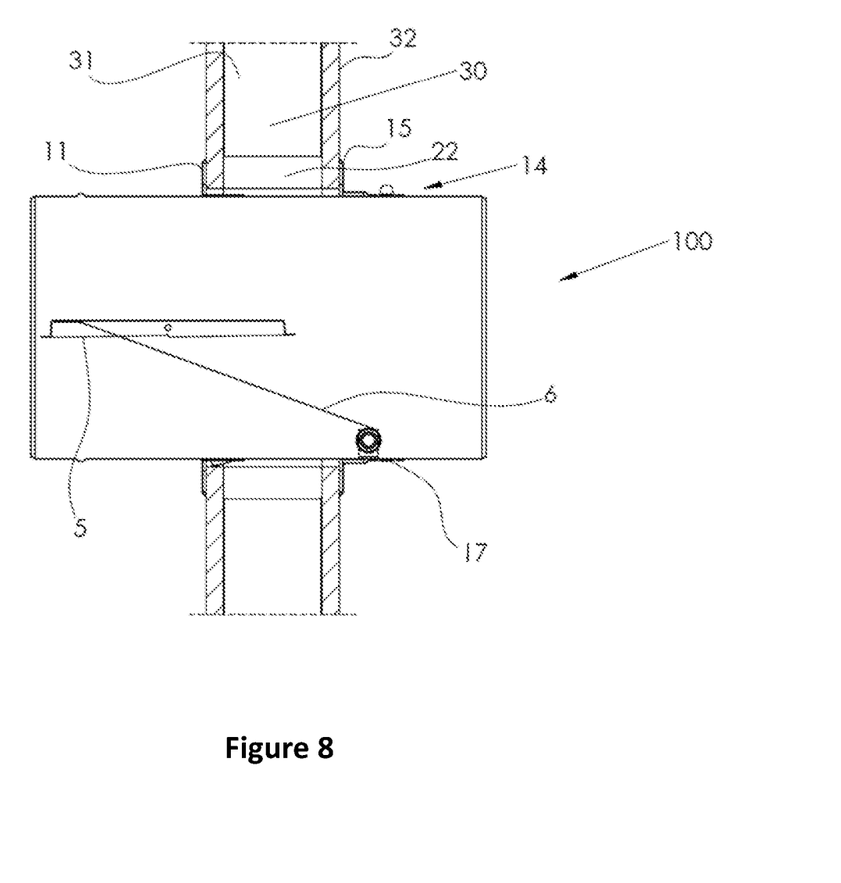
FIG. 8 shows a cross-sectional side view of the fire damper of FIG. 1 installed in a cavity in a wall.

Referring next to FIG. 8, a damper 100 of the present disclosure may be installed by the following method, described below with reference to installation through a wall of a building.

First, an aperture is created in the wall 30. The diameter of the aperture is preferably greater than an outside diameter of the body 1 of the damper 100, as provided in the relevant standards or codes.

Next, the insulating sleeve 22 may be inserted through the aperture into the wall cavity 31. Since the sleeve 22 is flexible it may be deformed to reduce its diameter before insertion into the cavity, and subsequently returned to its original shape once inside the cavity 31.

With the flexible sleeve 22 in position and the mounting means 14 removed from the body 1 of the damper 100, the damper body 1 can be inserted into the aperture. With the damper body 1 in position, the mounting means 14 can be reinstalled onto the body 1 such that the second flange 15 (or the intumescent material 21 attached to the second flange 15) is in contact with the surface 32 of the building element to thereby clamp the wall 30 between the first and second flanges 11, 15. The securing means 17 can be used to hold the mounting means 14 in position.

It will be appreciated that because some aspects of the presently disclosed damper are held in position by the clamping action of the first and second flanges 11, 15, rather than by fasteners extending through the flanges and into the building element, the flanges may be smaller (i.e. of smaller diameter) than the flanges of the fire dampers of the prior art. This may mean that the fire damper 100 can be installed closer to a ceiling or floor than some dampers of the prior art.

It will also be recognised that although the damper 100 of the present disclosure provides good sealing against the surface of the building element (e.g. wall), particularly when the flanges are provided with an intumescent material, the fire rated performance of the damper 100 is not dependent on the flanges excluding oxygen from the cavity, and so the damper 100 will perform to the required standard even if the building element has other non-sealed penetrations (for example for plumbing or wiring).

The damper of the present disclosure may also be more robust than some dampers of the prior art, and may be easier and more convenient to install.

According to a one aspect of the present disclosure, there is provided a flexible insulating sleeve configured for use with a fire damper, the sleeve comprising a high temperature insulating wool provided within a flexible casing.

Preferably, the casing is formed from a flexible metallic tape.

Preferably the metallic tape comprises metalized foil fibreglass fabric.

Preferably, the insulating sleeve is substantially ring shaped.

Preferably the high temperature wool comprises refractory ceramic wool fibre.

According to another aspect of the present disclosure, there is provided a fire damper for an air distribution system, the fire damper comprising: a body defining a flow path; a closure means adapted to close the flow path when a temperature within the flow path exceeds a predetermined maximum temperature; a first flange which is fixed to the body; and a mounting means comprising a second flange which is slidably engageable with and removable from the body; wherein the mounting means comprises securing means for securing the mounting means to the body such that a building element through which the fire damper extends, in use, can be clamped between the first and second flanges.

Preferably the body is substantially cylindrical.

Preferably, the mounting means comprises an adjustable ring.

Preferably, the adjustable ring is in the form of a hose clamp.

Preferably, the mounting means comprises at least one tongue which is configured to be clamped by the adjustable ring to the body of the fire damper. More preferably the mounting means comprises a plurality of said tongues.

Preferably the mounting means comprises at least one retaining means for retaining the adjustable ring.

Preferably, the first and second flanges are provided with an intumescent material on at least one face that abuts the building element when in use.

Preferably the body is provided with a plurality of spacer means adjacent the first flange, the spacer means spaced apart around the body, wherein the spacer means are configured to prevent contact between the body and an internal surface of an aperture in the building element through which the fire damper extends.

Preferably each spacer means comprises a ramp portion.

Preferably, a surface of the mounting means which faces the body of the fire damper is provided with an intumescent material.

Preferably, the fire damper comprises at least one locking means for locking the closure means in a closed configuration when the temperature within the flow path exceeds the predetermined maximum temperature.

Preferably, the or each locking means comprises a bimetallic strip.

Preferably, the fire damper is provided with the flexible insulating sleeve of the first aspect, wherein, in use, the flexible insulating sleeve is provided over the body and between the first and second flanges.

According to yet another aspect of the present disclosure, there is provided a fire damper for an air distribution system, the fire damper comprising: a body defining a flow path; a closure means comprising a rotatable plate, wherein the closure means is adapted to rotate the plate to a closed position when a temperature within the flow path exceeds a predetermined maximum temperature, thereby closing the flow path; at least one locking means mounted to an inner surface of the body of the fire damper, within the flow path; wherein the or each locking means is configured to move to a locking configuration when a temperature within the flow path increases above a predetermined temperature, wherein, when in the locking configuration the locking means is configured to allow the rotatable plate to close but prevents the rotatable plate from reopening.

Preferably, the or each locking means can be reset to its original configuration.

Preferably, the or each locking means automatically returns to its original configuration when the temperature decreases below the predetermined temperature.

Preferably the or each locking means comprises a bimetallic strip configured to bend inwards to a locking position when a temperature within the flow path increases above the second predetermined temperature.

Preferably the bimetallic strip is configured to returns to its original configuration when the temperature decreases below the predetermined temperature.

Preferably, at least one side of the bimetallic strip is tapered to allow the rotatable plate to pass the bimetallic strip when moving to the closed position.

Preferably, the bimetallic strip starts to bend inwards when the temperature in the flow path is in the range 30° C.-40° C.

According to yet a further aspect of the present disclosure, there is provided a fire damper for an air distribution system, the fire damper comprising: a body defining a flow path; a first flange which is fixed to the body; a closure means comprising a rotatable plate, wherein the closure means is adapted to rotate the plate to a closed position when a temperature within the flow path exceeds a predetermined maximum temperature, thereby closing the flow path; a holding means adapted to maintain the rotatable plate in an open position until the flow path exceeds the predetermined maximum temperature; a flexible insulating sleeve adapted to be positioned surrounding a portion of the body in use, the sleeve comprising a high temperature wool provided within a flexible outer casing; a mounting means comprising a second flange which is slidably engageable with and removable from the body; and at least one bimetallic strip mounted to an inner surface of the body of the fire damper, within the flow path; wherein the mounting means comprises securing means for securing the mounting means to the body such that, in use, a building element through which the fire damper extends can be clamped between the first and second flanges; wherein the or each bimetallic strip is configured to bend inwards to a locking configuration when a temperature within the flow path increases above the predetermined temperature, and wherein when in the locking configuration the bimetallic strip is configured to allow the rotatable plate to close but prevents the rotatable plate from reopening.

Preferably, at least one spacer is provided adjacent the first flange to create space between the building element and the body of the damper and ensure the body of the damper is centered.

Preferably, the spacer comprises a ramp portion.

Preferably, the damper comprises a plurality of spacers spaced apart around the circumference of the body.

Preferably, the holding means comprises a fusible link.

Preferably, the fire damper comprises two bimetallic strips, wherein a first of the bimetallic strips is located on a first side of the rotatable plate and a second of the bimetallic strips is located on an opposite side of the rotatable plate.

According to further aspects of the present disclosure there is provided a method of installing a fire damper, such as in one of the above aspects, in a cavity in a building element, the method comprising the steps of: inserting a flexible insulating sleeve within the cavity; inserting the body of the fire damper, with the mounting means removed, into the cavity through the insulating sleeve; positioning the first flange of the fire damper to abut a first side of the building element; installing the mounting means onto the body and adjusting the mounting means such that the second flange abuts the second side of the building element and the building element is clamped between the first and second flanges.

Preferably the step of adjusting the mounting means comprises the step of tightening a hose clamp to clamp at least one tongue of the flange to the body of the fire damper.

Reference to any prior art in this specification is not, and should not be taken as, an acknowledgement or any form of suggestion that that prior art forms part of the common general knowledge in the field of endeavour in any country in the world.

It is contemplated that some aspects of the presently disclosed devices may also be said broadly to be comprised in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Aspects of the present invention have been described by way of example only and it should be appreciated that modifications and additions may be made thereto without departing from the scope thereof.

What is claimed is:

1. A fire damper for an air distribution system, the fire damper comprising:
a body defining a flow path;
a closure means adapted to close the flow path when a temperature within the flow path exceeds a predetermined maximum temperature;
a first flange which is fixed to the body; and
a mounting means comprising a second flange, wherein the mounting means is configured to be slidably engageable with and removable from the body,
wherein the mounting means comprises a securing means for securing the mounting means to the body such that a building element through which the fire damper extends, in use, can be clamped between the first and second flanges, the securing means comprising an adjustable ring configured to clamp the mounting means to the body of the fire damper; and
wherein the mounting means comprises at least one tongue which is configured to be clamped by the adjustable ring to the body of the fire damper.

2. The fire damper of claim 1 wherein the body is substantially cylindrical.

3. The fire damper of claim 1 wherein the adjustable ring is in the form of a hose clamp.

4. The fire damper of claim 1 wherein the mounting means comprises a plurality of said tongues.

5. The fire damper of claim 1 wherein the mounting means comprises at least one retaining means for retaining the adjustable ring.

6. The fire damper of claim 1, wherein the first flange and the second flange are configured to hold the fire damper in position by a clamping action without the use of fasteners extending through the flanges and into the building element.

7. The fire damper of claim 1 wherein a surface of the mounting means which faces the body of the fire damper is provided with an intumescent material.

8. The fire damper of claim 1 wherein the first and second flanges are provided with an intumescent material on at least one face that abuts the building element when in use.

9. The fire damper of claim 8 wherein the body is provided with a plurality of spacer means adjacent the first flange, the spacer means spaced apart around the body, wherein the spacer means are configured to prevent contact between the body and an internal surface of an aperture in the building element through which the fire damper extends.

10. The fire damper of claim 9 wherein each spacer means comprises a ramp portion.

11. The fire damper of claim 1 wherein the fire damper comprises at least one locking means for locking the closure means in a closed configuration when the temperature within the flow path exceeds the predetermined maximum temperature.

12. The fire damper of claim 11 wherein the, or each, locking means comprises a bimetallic strip.

13. The fire damper of claim 1 provided with a flexible insulating sleeve over the body and between the first and second flanges.

14. The fire damper of claim 13 wherein the insulating sleeve is substantially ring shaped.

15. The fire damper of claim 14 wherein the flexible insulating sleeve comprises a high temperature insulating wool completely encased within a flexible casing.

16. The fire damper of claim 15 wherein the flexible casing is formed from a flexible metallic tape.

17. The fire damper of claim 16 wherein the metallic tape comprises metalized foil fibreglass fabric.

18. The fire damper of claim 15 wherein the high temperature wool comprises refractory ceramic wool fibre.

19. A fire damper for an air distribution system, the fire damper comprising:
   a body defining a flow path;
   a closure means adapted to close the flow path when a temperature within the flow path exceeds a predetermined maximum temperature;
   a first flange which is fixed to the body;
   a flanged ring comprising an annular base and a second flange, wherein the flanged ring is configured to be slidably engageable with and removable from the body; and
   an adjustable ring configured to secure the flanged ring to the body such that a building element through which the fire damper extends, during use, is allowed to be clamped between the first and second flanges;
   wherein the flanged ring comprises at least one tongue configured to be clamped by the adjustable ring to the body of the fire damper.

20. A fire damper for an air distribution system, the fire damper comprising:
   a body defining a flow path;
   a closure plate adapted to close the flow path when a temperature within the flow path exceeds a predetermined maximum temperature;
   a first flange which is fixed to the body;
   a flanged ring comprising an annular base and a second flange, wherein the flanged ring is configured to be slidably engageable with and removable from the body;
   a securing means integrally formed in the annular base and
   an adjustable ring configured to secure the flanged ring to the body such that a building element through which the fire damper extends, during use, is allowed to be clamped between the first and second flanges.

* * * * *